US008038874B2

(12) United States Patent
McKinney

(10) Patent No.: US 8,038,874 B2
(45) **Date of Patent: *Oct. 18, 2011**

(54) TREATMENT SYSTEM

(76) Inventor: Jerry L. McKinney, Silsbee, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,657

(22) Filed: Jan. 24, 2011

(65) Prior Publication Data

US 2011/0132937 A1 Jun. 9, 2011

Related U.S. Application Data

(63) Continuation of application No. 11/946,474, filed on Nov. 28, 2007, now Pat. No. 7,875,170.

(51) Int. Cl.
*C02F 1/50* (2006.01)

(52) U.S. Cl. ........ 210/127; 210/205; 222/442; 222/450; 222/439

(58) Field of Classification Search .................. 210/126, 210/127, 119, 205; 222/425, 438–440, 442, 222/444, 450, 445
See application file for complete search history.

(56) References Cited

U.S. PATENT DOCUMENTS

| | | | | |
|---|---|---|---|---|
| 3,229,854 | A * | 1/1966 | Turnquist | 222/67 |
| 4,135,263 | A | 1/1979 | Anderson | |
| 4,707,865 | A | 11/1987 | Ludwig et al. | |
| 4,764,992 | A | 8/1988 | Delia | |
| 5,152,015 | A * | 10/1992 | Fourman | 4/225.1 |
| 5,185,891 | A | 2/1993 | Rise | |
| 6,627,071 | B1 | 9/2003 | Braden | |
| 7,875,170 | B2 * | 1/2011 | McKinney | 210/127 |
| 2003/0155311 | A1 * | 8/2003 | Chaffin | 210/754 |

* cited by examiner

*Primary Examiner* — Terry Cecil
(74) *Attorney, Agent, or Firm* — Browning Bushman P.C.

(57) ABSTRACT

A treatment system comprising a holding tank for a source liquid, a pump having a pump inlet for the intake of source liquid and a pump discharge, at least one conduit connected to the pump discharge and a liquid dispenser connected to the one conduit, the dispenser comprising a container for treating liquid, a feed conduit, a dosing chamber for receiving treating liquid via the feed conduit, a vent for breaking an airlock in the dosing chamber, a first valve connected to the dosing chamber for controlling flow of treating liquid through the first valve, a second valve connected to the first valve, the second valve being operative in response to pressure resulting from the pumping of source liquid through the at least one conduit to close the second valve and open the first valve, stopping of the pump resulting in opening of the second valve and introduction of the treating liquid from the dosing chamber and into the source liquid.

1 Claim, 13 Drawing Sheets

TREATMENT SYSTEM

CROSS REFERENCE TO RELATED APPLICATION

This application is a continuation of U.S. patent application Ser. No. 11/946,474, filed on Nov. 28, 2007, now U.S. Pat. No. 7,875,170, for TREATMENT SYSTEM, the disclosure of which is incorporated herein by reference for all purposes.

BACKGROUND OF THE INVENTION

1. Field of the Invention

The present invention relates to a treatment system for treating a source liquid and more particularly to such a system having a dispenser for dosing a treating liquid into the source liquid.

2. Description of the Prior Art

There are many systems where it is desired to treat a liquid, hereinafter referred to as a source liquid, with a liquid treating agent to modify the source liquid and produce a modified source liquid having certain desired properties. One example of this is an aerobic wastewater treatment system (AWTS) which generally comprises a settling or trash tank to remove most solids, an aerobic treatment tank to treat the effluent from the solids separation tank and aerobically digest the bulk of remaining solids and a pump or holding tank for receiving the effluent from the aerobic treatment tank. Generally speaking, the holding tank, commonly referred to as a pump tank, receives a substantially solids free wastewater (SSFW) which can be removed from the holding tank, usually by a pump, and disposed of into a stream, sprayed on vegetation, introduced into a drain field, etc.

In these AWTS, it is sometimes necessary that the SSFW's be disinfected prior to leaving the system. To this end, disinfecting systems, e.g., chlorinators, which can be either solid or liquid, have been employed to introduce a disinfectant into the SSFW prior to or concurrent with the removal of the SSFW from the holding tank.

Whether the disinfecting agent be a solid or a liquid, a requirement is that the SSFW to be pumped or otherwise removed from the system must be in contact with the disinfecting agent for a sufficient period of time to ensure that the SSFW is substantially free of bacteria.

Conventionally, prior art disinfectant systems for use in AWTS, whether employing a liquid or solid disinfectant, typically mix the disinfectant with the SSFW as the SSFW is being pumped out of the holding tank. Indeed, most presently used liquid disinfectant systems for AWTS employ a Venturi system to draw the liquid disinfectant from containers of the disinfectant and into the holding/pump tank. The Venturi based systems necessarily introduce the disinfectant into the pump tank while the pump is discharging liquid from the pump tank meaning the desired degree of residence or contact time between the disinfectant and SSFW may not be realized.

Additionally, the Venturi based systems frequently introduce an excessive amount of disinfectant into the SSFW resulting in waste of disinfectant and damage to vegetation or wildlife if the disinfected water is sprayed on the vegetation introduced into a drain field or pumped to a drainage ditch, canal, creek or the like. Lastly the Venturi based systems are prone to plugging from fine solids carried over from the aerobic treatment tank.

SUMMARY OF THE INVENTION

In one aspect the present invention provides a treatment system comprising a holding or pump tank having an inlet for receiving a source liquid to be treated. A pump has an intake disposed in the holding tank, the pump having a discharge. It will be recognized that the pump could be in the holding tank or external to the holding tank. At least one conduit is connected to the pump discharge and a liquid dispenser is connected to the at least one conduit. The liquid dispenser comprises a container for a treating liquid, e.g., a disinfectant. A feed conduit having a first end is in open communication with the container, the feed conduit having a second end. The upper portion of a dosing chamber is operatively connected to the second end of the feed conduit. The dosing chamber has a vent system which breaks any air lock in the dosing chamber. There is a first valve operatively connected to the upper portion of the dosing chamber, the first valve having a first valve element which is floatable in the treating liquid and a first valve seat. When the first valve element is seated on the first valve seat, flow of treating liquid from the upper portion of the dosing chamber through the first valve is prevented. There is a second valve connected to the first valve, the second valve having a second valve element and a second valve seat, the second valve being in communication with the at least one conduit. In this embodiment of the invention, when the pump is activated, source liquid in the holding tank flows through the at least one conduit. This flow of source liquid results in an increased pressure acting against the second valve element to force the second valve element into seating engagement with the second valve seat. Additionally, at about this point, the first valve element is unseated into a floating condition in the treating liquid in the upper portion of the dosing chamber. Stoppage of the pump results in unseating of the second valve element and the flow of treating liquid from any space above the second valve seat and in to the at least one conduit.

DETAILED DESCRIPTION OF PREFERRED EMBODIMENTS

While the present invention will be described with particular reference to a treatment system comprising a wastewater system and more specifically an aerobic wastewater system, it is to be understood that it is not so limited. The treating system of the present invention can be used to introduce or dose a treating liquid into a source liquid to give the source liquid desired properties. Thus while in the specific description which follows, the invention is described in terms of a treatment system used for wastewater and more specifically for disinfecting wastewater, it is to be understood that it could be employed even in a wastewater treatment system to add herbicides, fertilizers or other treating agents to source liquid, e.g., SSFW, prior to its disposal whether such disposal be to a drain field, a sprinkler system, a drainage ditch, etc.

Figure 1:
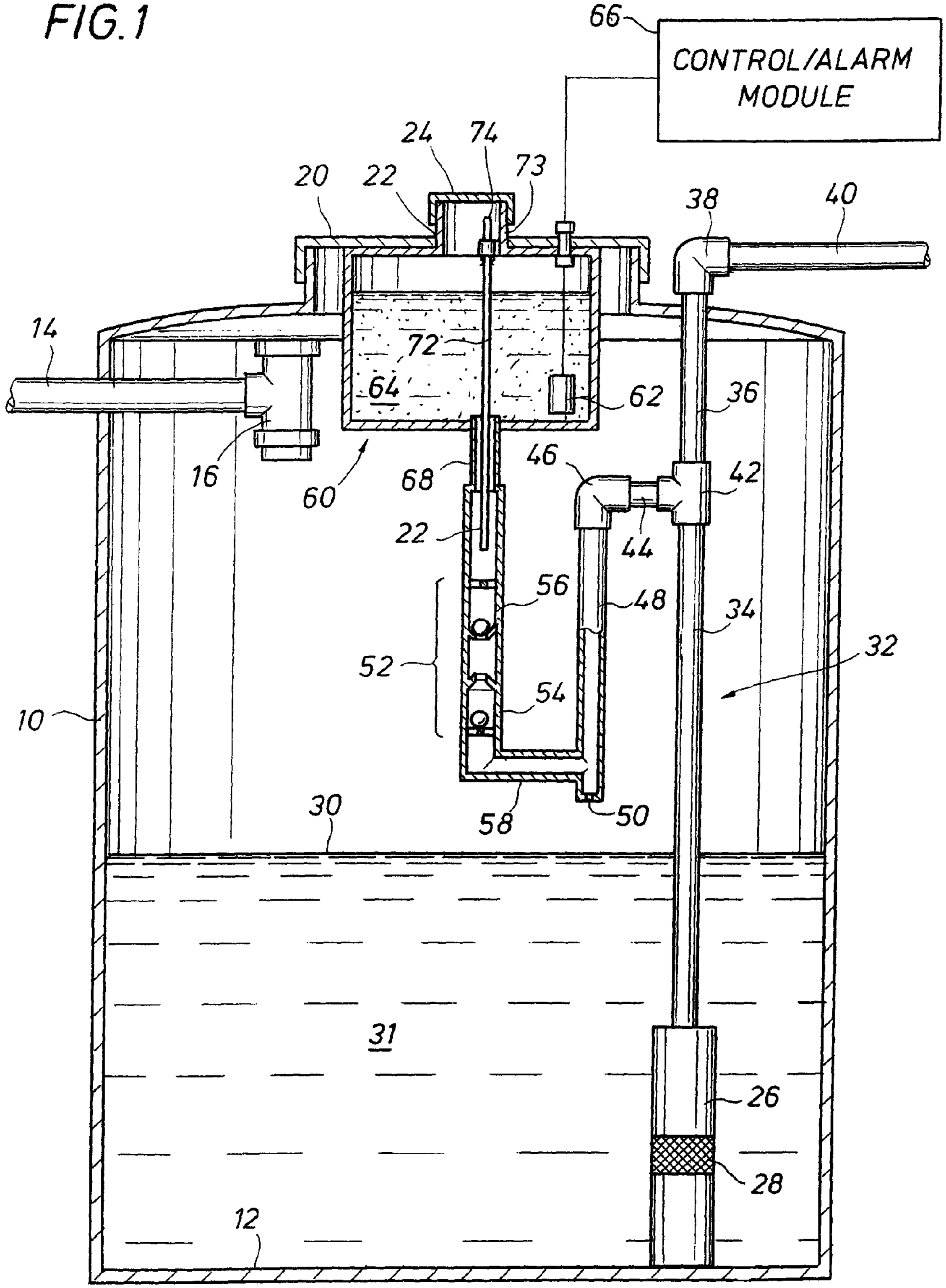
FIG. 1 is an elevational view, partly in section, of one embodiment of the present invention.

Referring then to FIG. 1, there is shown a holding/pump tank 10 which is generally cylindrical, having a substantially planar bottom wall 12. An inlet 14 coupled to a T fitting 16 is used to introduce SSFW into tank 10. In this case the inlet 14 would be connected to an aerobic treatment tank commonly used in an AWTS. Tank 10 has a neck 18 providing an opening for accessing the interior of tank 10, the opening being covered by a removable closure 20, closure 20 having an opening 22. A pump 26 is disposed in tank 10. Pump 26 has an inlet 28 and is positioned below the level 30 of the source liquid 31 in tank 10. In the embodiment shown in FIG. 1, pump 26 is connected to a discharge conduit shown generally as 32 having a lower section 34 connected to pump 26 and an upper section 36 connected by an elbow 38 to an outlet pipe 40. As noted above, outlet pipe 40 can be connected to a drain field, a sprinkler system, etc. Upper and lower portions 34 and 36 of discharge pipe 32 are connected by a T 42 which in turn is connected by union 44 and an elbow 46 to a conduit 48 having a flow restrictor 50 which, as shown, can be an orifice plate and acts to control upstream pressure in conduit 48 when source liquid 31 is flowing therethrough.

Conduit 48 is in turn connected to a valving assembly shown generally as 52 comprising an upper valve 56 and a lower valve 54, lower valve 54 being connected to conduit 48 via a bridge conduit 58. As can be seen, flow restrictor 50 is below the level of lower valve 54, more generally below the valve seat in valve 54.

Disposed in tank 10 is a disinfectant container shown generally as 60, container 60 being mounted in any suitable fashion. A level sensor 62 is disposed in the treating liquid or disinfectant 64 in container 60, level sensor 62 being connected to a control/alarm module 66 which sounds an alarm if the level of disinfectant 64 falls below a certain level in container 60. Container 60 communicates with a feed line 68 whereby disinfectant 64 can gravity flow into the upper portion 70 of a dosing chamber. A vent line 72 extends into portion 70 and has an open end 74 opening into a neck portion 73 of container 60, i.e., in the vapor space above the level of disinfectant 64. Neck portion 73 extends through opening 22 in closure 20 and is covered with a removable closure 24.

Figure 2:
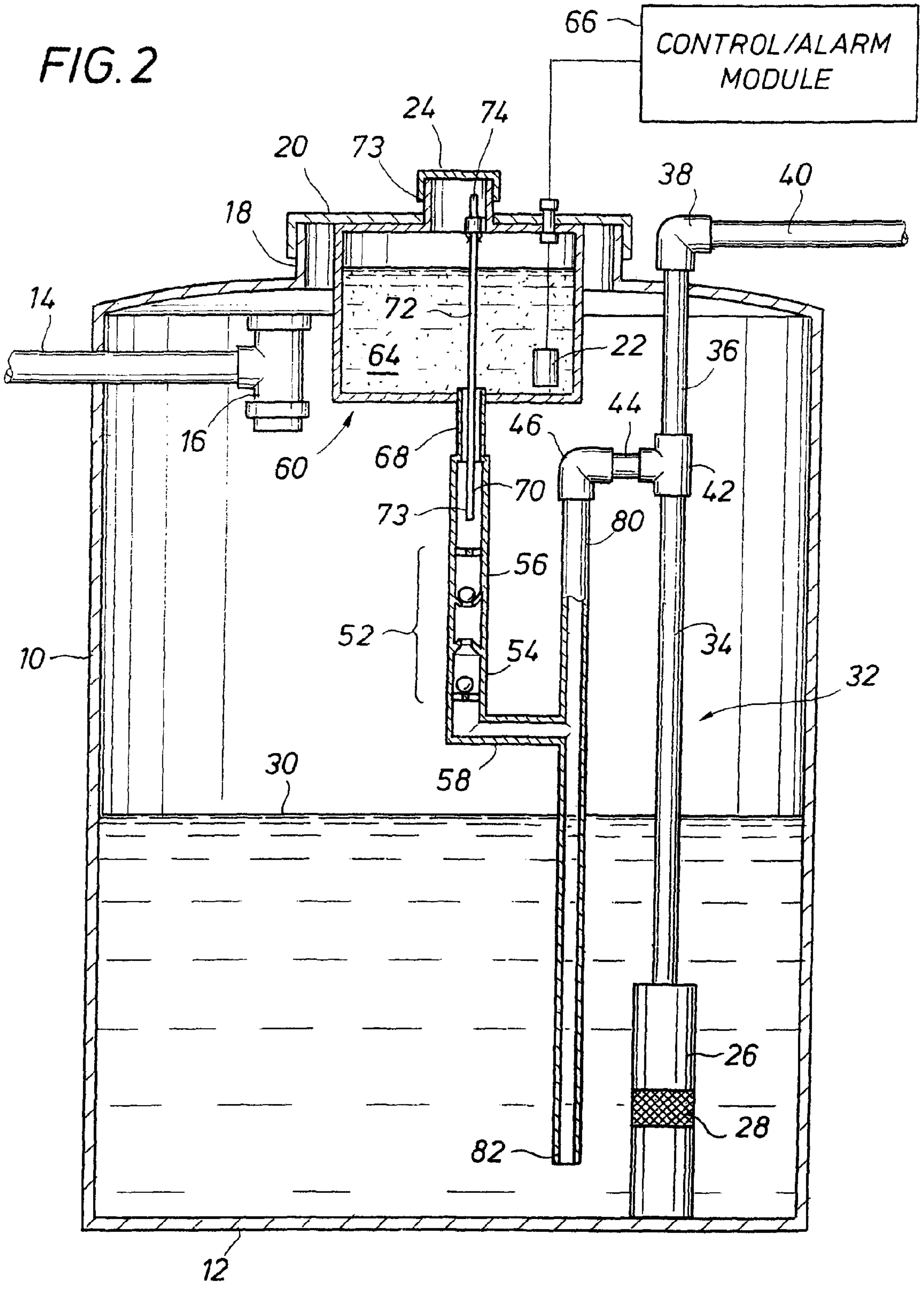
FIG. 2 is an elevational view, partly in section, of another embodiment of the present invention.

Referring now to FIG. 2, there is shown a modified embodiment of the present invention. The embodiment shown in FIG. 2 differs from that shown in FIG. 1, in that in FIG. 1 conduit 48 serves only as a return line such that SSFW flowing into conduit 48 returns into flow tank 10 at a point which is above the level 30 of SSFW 31 in tank 10. In FIG. 2 on the other hand conduit 80 serves as a recirculation line such that at least a portion of the discharge from pump 26 is returned and discharged through open end 82 of conduit 80 into the source liquid 31 below the level 30 thereof. Generally speaking and as described above with respect to FIG. 1, a flow restrictor or other back pressure creating device, e.g., a valve, is used in conjunction with conduit 80 connected to valve 54 and is positioned below the second valve 56. However, as shown, in the case of the embodiment shown in FIG. 2, the necessary back pressure may be created from the head pressure of the source liquid 31 in tank 10. It will be understood, however, that a flow restrictor or regulator can be employed with conduit 80 of the valving system 52, if necessary.

Figure 3:
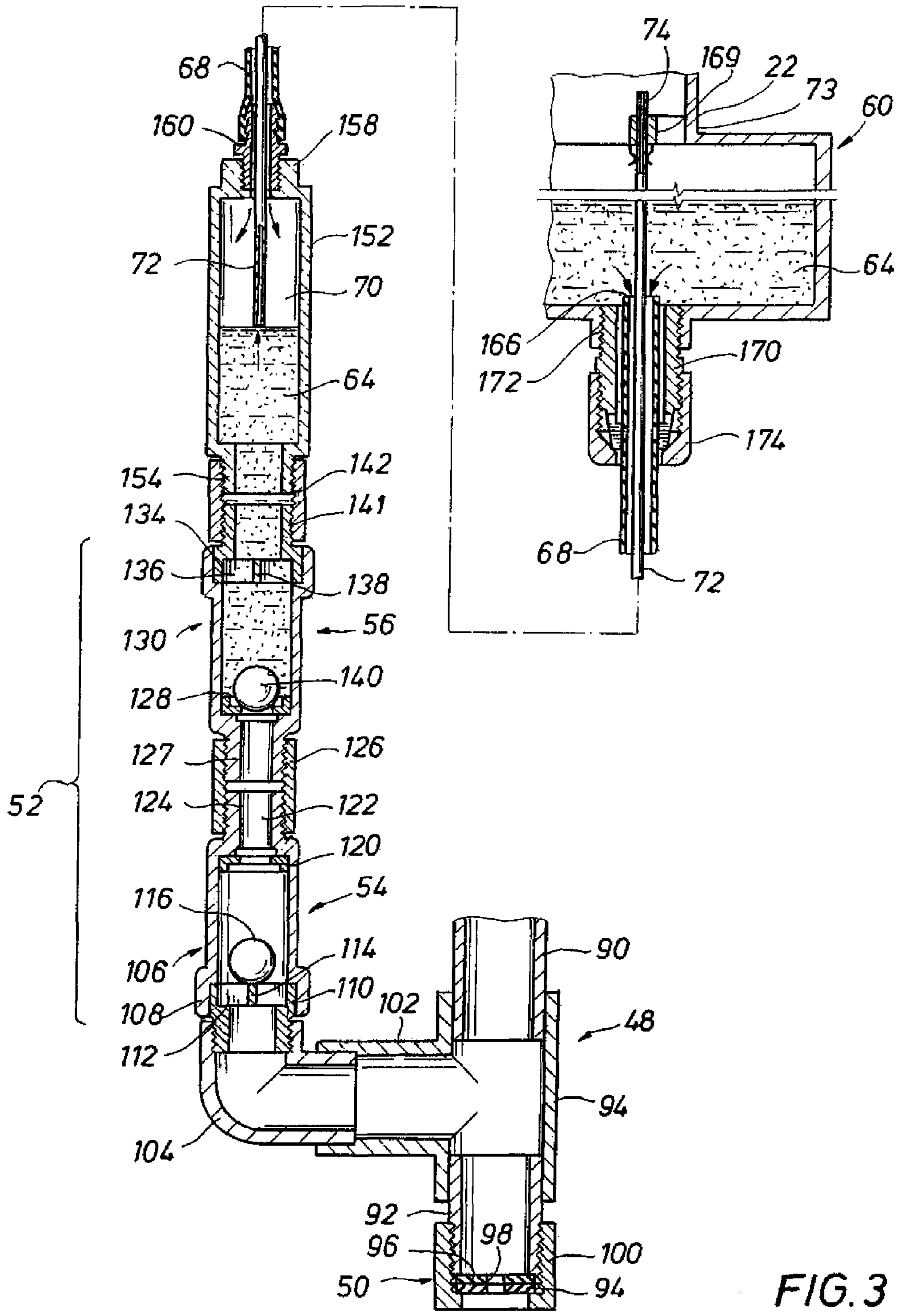
FIG. 3 is an elevational, cross-sectional view showing in greater detail one embodiment of the dispenser used in the present invention in a first mode.

Referring now to FIG. 3, an embodiment of the dispenser system is shown in greater detail. The detailed embodiment shown in FIG. 3 is essentially that used in the embodiments of FIGS. 1 and 2. Return conduit shown generally as 48 comprises a first pipe section 90 connected to pump 26 (not shown in FIG. 3), a second pipe section 92, pipe sections 90 and 92 being interconnected by a T 94. Flow restrictor 50 comprises a pair of discs 94 and 96 forming a common orifice 98. It will be understood that the flow restrictor could be an adjustable throttling valve of various types. A cap 100 is threadedly received on the threaded end of pipe 92 to hold discs 94 and 96 in position. T 94 has a branch 102 which is connected to an elbow 104. Lower valve 54 has a valve body shown generally as 106, the lower end of body 106 having an upset 108 forming a counterbore in which is received one end of an insert 110, insert 110 having internal ribs 112 and 114 in a criss-cross or other relationship to permit flow but prevent ball 116 from falling out of lower valve 54, e.g., during assembly, storage, etc. It will be understood that insert 110 could be threaded into upset portion 108 or glued therein. The lower end of insert 110 is provided with threads which are threadedly received in elbow 104. The upper end of valve body 106 is provided with a valve seat 120 surrounding a bore 122 extending through a neck portion 124 of valve body 106. Neck portion 124 is threadedly received in one end of a coupling 126.

Turning now to upper valve 56, valve 56 has essentially the same structure as valve 54 but its position is reversed, i.e., whereas in valve 54 valve seat 120 is at the upper end of valve 54, in valve 56 the valve seat 128 is at the lower end of valve 56, i.e., the valve seats are proximal one another. The upper end of valve body 130 of valve 56, like valve 54 has an upset 132 forming a counterbore in which is received an insert 134 having ribs 136 and 138 in a criss-cross or any configuration which permits flow but prevents ball 140 from falling out of valve 56 during assembly of the system. Insert 134 has a threaded portion 141 received in one end of a coupling 142. It should also be noted that the threaded neck portion 127 of valve body 130 is threadedly received in coupling 126 to thereby couple valves 56 and 54 together.

Dosing chamber 70 is formed by a tubular housing 152 having a threaded neck 154 at its lower end which is threadedly received in threaded coupling 141. Housing 152 has an upper boss 158 with an internal female thread in which is received a threaded fitting 160. Fitting 160 is connected to one end of feed conduit 68. Conduit 68 has an open end 166 in open communication with the interior of treating liquid (disinfectant) container 60 holding a volume of disinfectant 64. Feed conduit 68 is connected to container 60 via an adaptor 170 threadedly received in a threaded boss 172 of container 60. A compression fitting 174 threadedly received on adaptor 170 securely holds feed conduit 164 in place. As can be seen, vent line 72 extends through feed conduit 68 and, in the embodiment shown in FIG. 3, extends upward into the neck 22 of container 60 and is held by an adjustable clip 169 such that the depth of the vent line 72 in dosing chamber 70 can be adjusted.

Figure 3A:
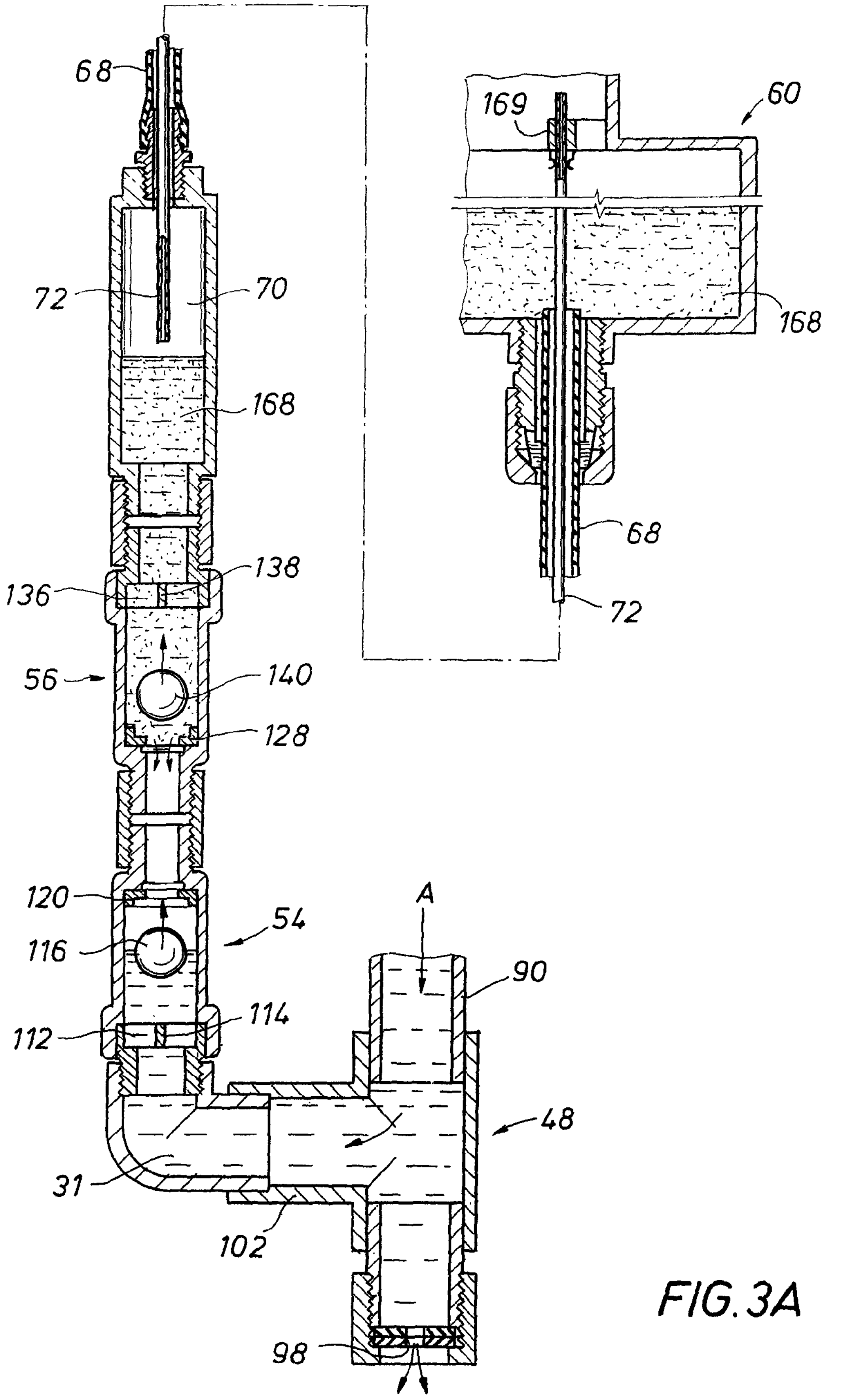
FIG. 3A is a view similar to FIG. 3 showing the dispenser in a second mode.
Figure 4:
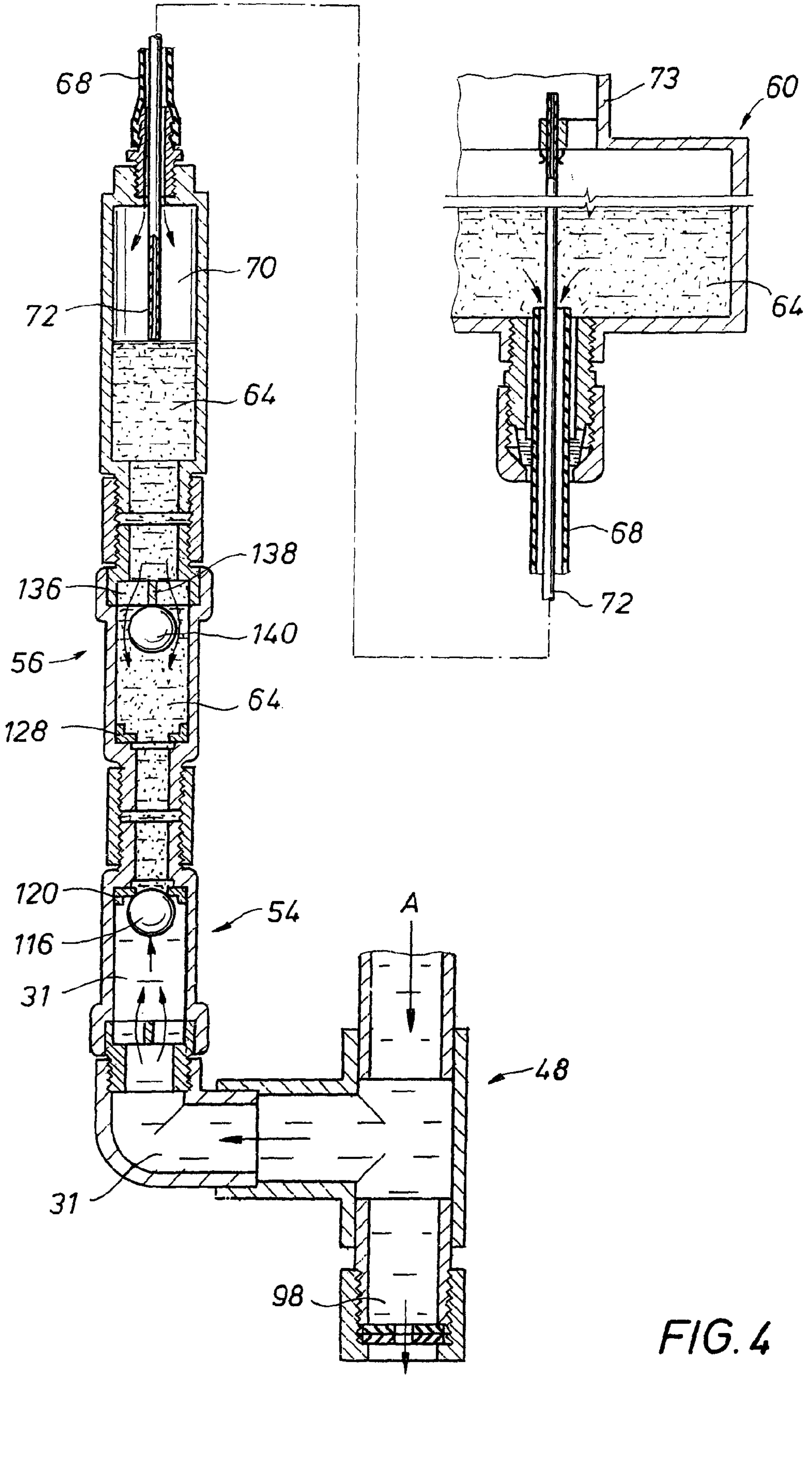
FIG. 4 is a view similar to FIG. 3 showing the dispenser of FIG. 3 in a third mode.
Figure 5:
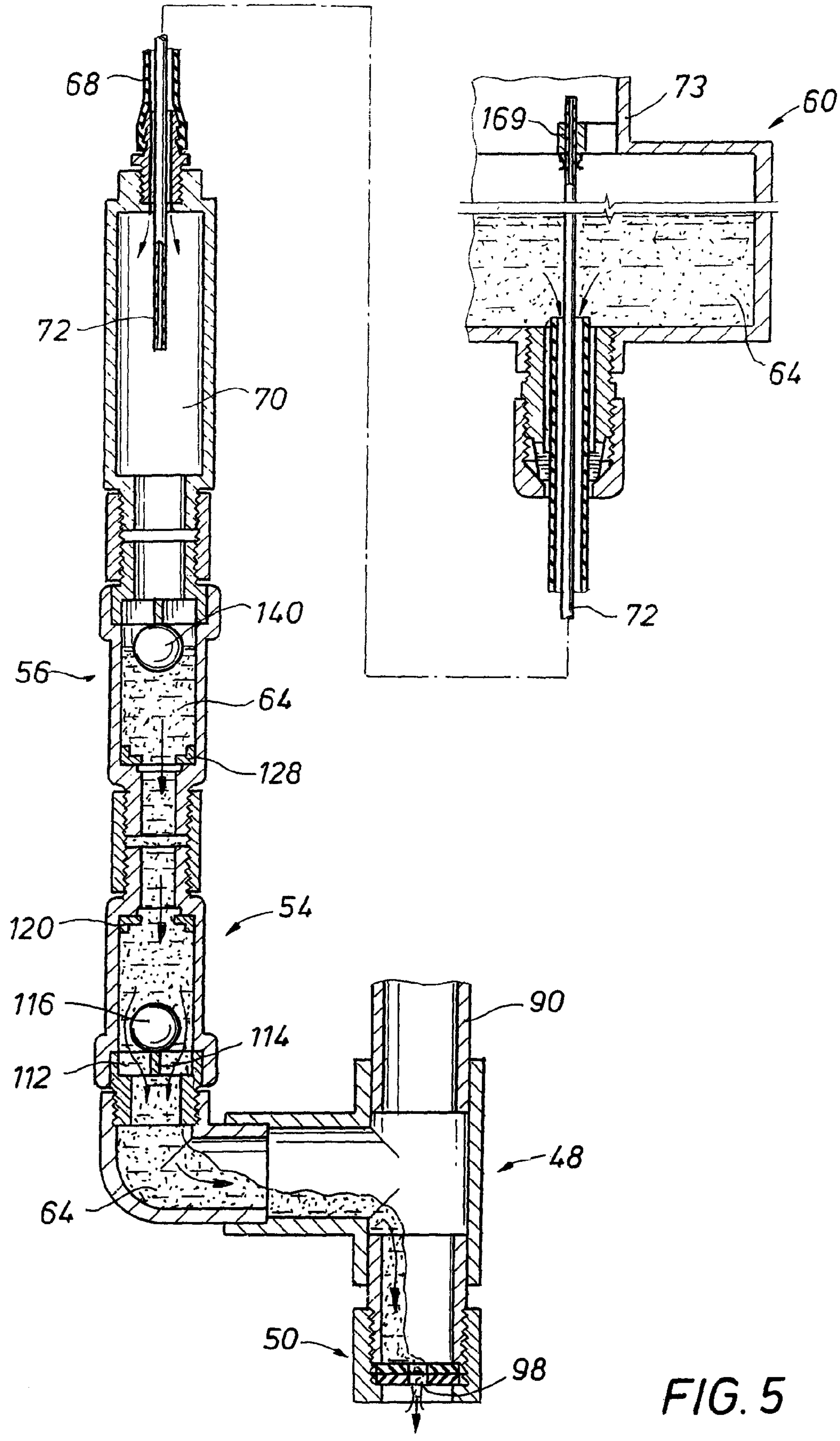
FIG. 5 is a view similar to FIG. 4 showing the dispenser of FIG. 3 in a fourth mode.

In the mode of the embodiment shown in FIG. 3, and as can be seen, ball 140 which is floatable in the treating liquid 64 is seated on valve seat 128 such that no treating liquid 64 can flow out of dosing chamber 70 through valve 56. This condition exists when pump 26 is not running. FIGS. 3A and 4 show the condition of the dispenser system of the present invention when pump 26 has been turned on while FIG. 5 depicts the condition of the dispenser system when pump 26 has again been turned off. Returning again briefly to FIG. 3, and as shown in the drawing, treating liquid 64 can flow through feed conduit 68 and into dosing chamber 70, filling dosing chamber 70 and valve 56 when ball 140 is seated on seat 128. It should be noted that even though ball 140 is floatable in treating liquid 64, the head pressure of the treating liquid 64 as chamber 70 fills will force ball 140 into sealing engagement with seat 128. In this respect, ball 140 acts like a flapper valve commonly used in the tank of commodes.

Returning now to FIG. 3A, once pump 26 has been activated, a portion of the flow from the discharge of pump 26 flows in the direction of arrow A through conduit 90 through T 102 and into valve 54. Since ball 116 is floatable in the source liquid 31, ball 116 is moved off of ribs 112, 114 and as shown by the arrow moves upward towards valve seat 120 of valve 54. It should be noted that once pump 26 is turned on, air in the space below valve 54 will be compressed by source liquid 31 and can move ball 116 into contact with valve seat 120. In other words, ball 116 can be forced into sealing engagement with seat 120 by air pressure, source liquid 31 pressure or both. This upward movement of ball 116 caused by the pressure of source liquid 31 being pumped by pump 26 compresses vapor in the space between valves 54 and valves 56 dislodging ball 140 from seat 128 and permitting ball 140 to float in treating liquid 64. Again, this is analogous to the action of a flapper valve in a commode tank when the flushing handle is actuated, i.e., once a force lifts, e.g., nudges, ball 140 off seat 128, it floats in treating liquid 64. The condition of the system shown in FIG. 3A occurs just after pump 26 has been turned on to force source liquid 31 into valve 54 to float ball 116 towards seat 120. In this case, the "nudge" to unseat ball 128 is the pressure surge downstream from ball 140 which causes ball 140 to dislodge from seat 128. As can be seen in FIG. 3A, ball 128 has moved slightly off of seat 128 and is moving upwardly towards ribs 136 and 138 which will prevent further upward movement of ball 140. It will be understood that the amount of pressure exerted on ball 116 can be adjusted by varying the orifice size of orifice plates 94 and 96 or if a valve is used by choking down on the valve. Suffice to say that almost any force (pressure) by any means which breaks contact between ball 140 and seat 128 is sufficient to make ball 140 float, e.g., air from an air compressor.

Referring now to FIG. 4, the pressure of source water 31 being exerted by pump 26 which is now running, has forced ball 116 into seating engagement with seat 120 preventing movement of treating liquid 31 into valve 54. It should be noted that this initial surge of pressurized air/source liquid 31 into valve 54 resulting from the starting of pump 26 may result in a small amount of source liquid 31 passing ball 116 into the space between valves 54 and 56. Further, as seen in FIG. 3A, the level of treating liquid 64 in dosing chamber 70 will have dropped below the bottom end of vent line 72 reflecting the fact that ball 140 has been dislodged from seat 128 and treating liquid 64 in valve 56 is beginning to flow downwardly towards valve 54.

Returning to FIG. 4, once ball 116 seats against seat 120 and as pump 26 continues to run, if the level of treating liquid 64 in dosing chamber 70 has dropped below the lower open end of vent line 73, treating liquid 64 will flow through feed conduit 68 until it reaches and perhaps rises slightly in vent line 73 at which point further flow of treating liquid 64 into dosing chamber 70 will cease. Thus, as long as pump 26 continues to run, an essentially static condition will be reached in valves 54 and 56 in the sense that treating fluid 64 will remain in chamber 70, valve ball or valve element 116 will be seated against seat 20 and floating ball 140 will engage ribs 136 and 138. Thus, there will be no flow of treating liquid 64 into source liquid 31 in tank 10.

While reference has sometimes been made to the dosing chamber as being chamber 70, as FIG. 4 shows the amount of treating liquid 64 which will be dosed into tank 10 once pump 26 is de-energized will be all of the treating liquid 64 occupying the free space above valve seat 120 in valve 54. Thus, while chamber 70 can be considered the upper portion of the dosing chamber, in reality the dosing chamber is all of the free space or volume provided by valves 54, 56, chamber 70 and any couplings/connectors which connect tubular housing 152 and valves 54 and 56 together.

FIG. 5 depicts the condition when pump 26 has been turned off. In this state, the pressure against ball 116 from source liquid 31 forcing ball 116 into seating engagement with seat 120 is released and source liquid 31 drains out of the return line 48 as well as out of the space below ball 116 and valve 54 and into tank 10. As soon as the pressure of source fluid 131 against ball 116 is relieved, ball 116 will disengage from seat 120 and move downwardly to engage ribs 112 and 114 permitting flow through valve 54. Likewise, treating fluid 64 in dosing chamber 70, valve 56 and the space between valve 56 and valve 54 will now empty into return conduit 48, through orifice 98 and into source liquid 31 in tank 10. Once treating liquid 64 has emptied from valve 56, ball 140 will again seat on seat 128 and the dosing chamber 70 will again start filling via feed conduit 68 until the treating liquid 64 reaches the bottom end of or slightly into vent line 72 at which point an airlock will form in dosing chamber 60 preventing further flow of treating liquid 64 through feed conduit 68 into chamber 70. Once the bottom end of vent line 72 is at or below the level of treating liquid 64 in dosing chamber 70, no air can escape from dosing chamber 70, i.e., an air lock will be formed preventing flow of treating liquid 64 out of container 60. Thus the system will return to the condition shown in FIG. 3, the pump being in the off position.

Figure 6:
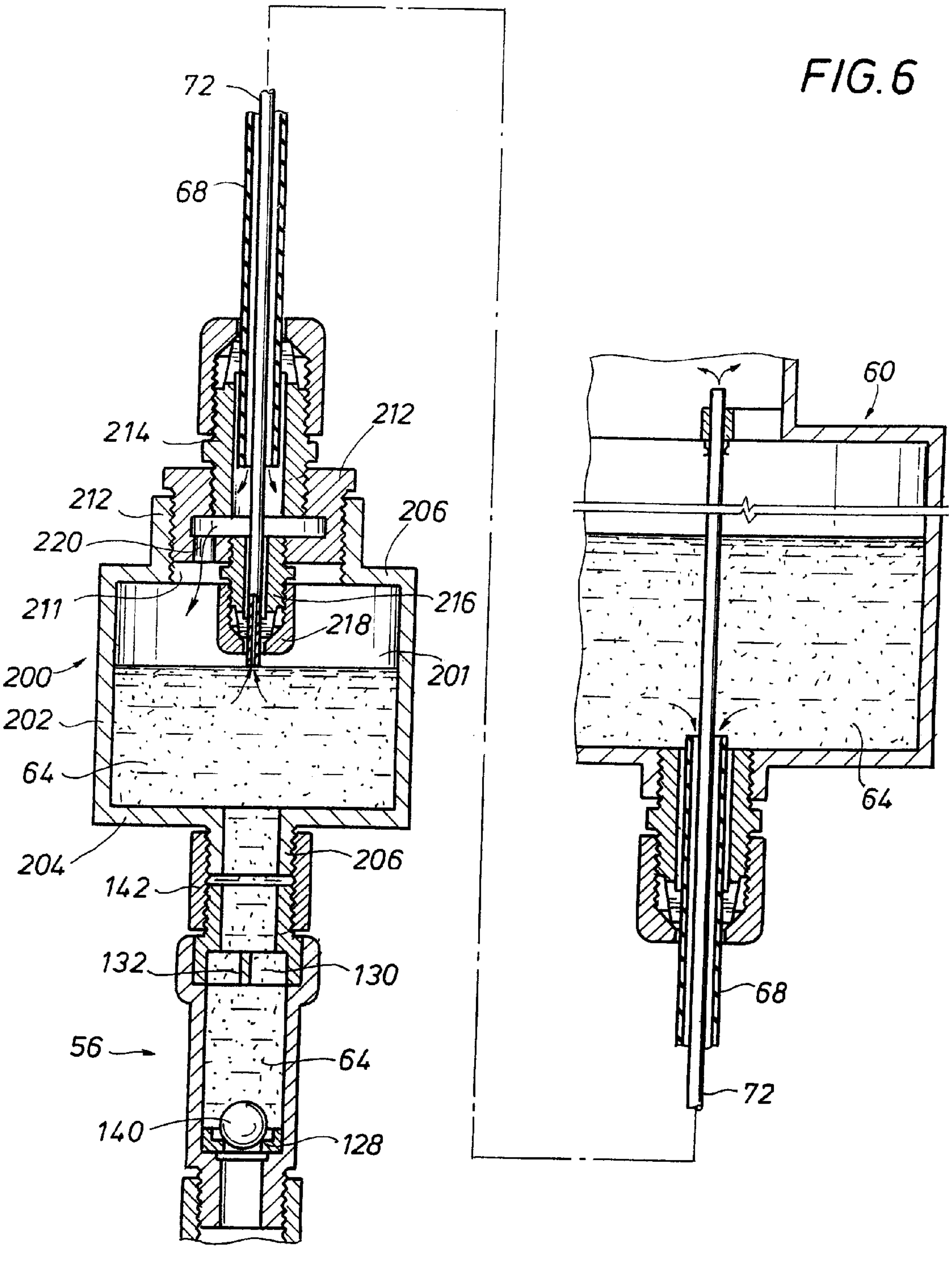
FIG. 6 is an elevational, cross-sectional view showing another embodiment of the dispenser used in the present invention.

Turning now to FIG. 6, there is shown a variation of the dispenser used in the present invention. While the principle of operation of the embodiment shown in FIG. 6 is the same as that described in FIGS. 3-5, it will noted that there is a different sized dosing chamber. A canister shown generally as 200 having a generally cylindrical side wall 202, a bottom wall 204 and a top wall 206 is provided with an externally, threaded boss 208 extending from bottom wall 204 and an internally threaded neck 210 extending from top wall 206. Boss 208 is threadedly received in coupling 142. Threadedly received in threaded neck 210 is a plug 212 having a bore therethrough, plug 212 also being internally threaded for receiving an externally, threaded coupler 214. Plug 212 has a second internally threaded portion at its lower end to which is threadedly affixed a compression fitting 218 which releasably, sealingly holds vent line 73 in place. It can be seen that treating liquid 64 can flow through feed conduit 68 into coupler 214 through a port 220 in plug 212 and into dosing chamber 201 formed in canister 200. It will be recognized that the size of canister 200 can be easily varied thereby varying the volume of dosing chamber 201.

Figure 7:
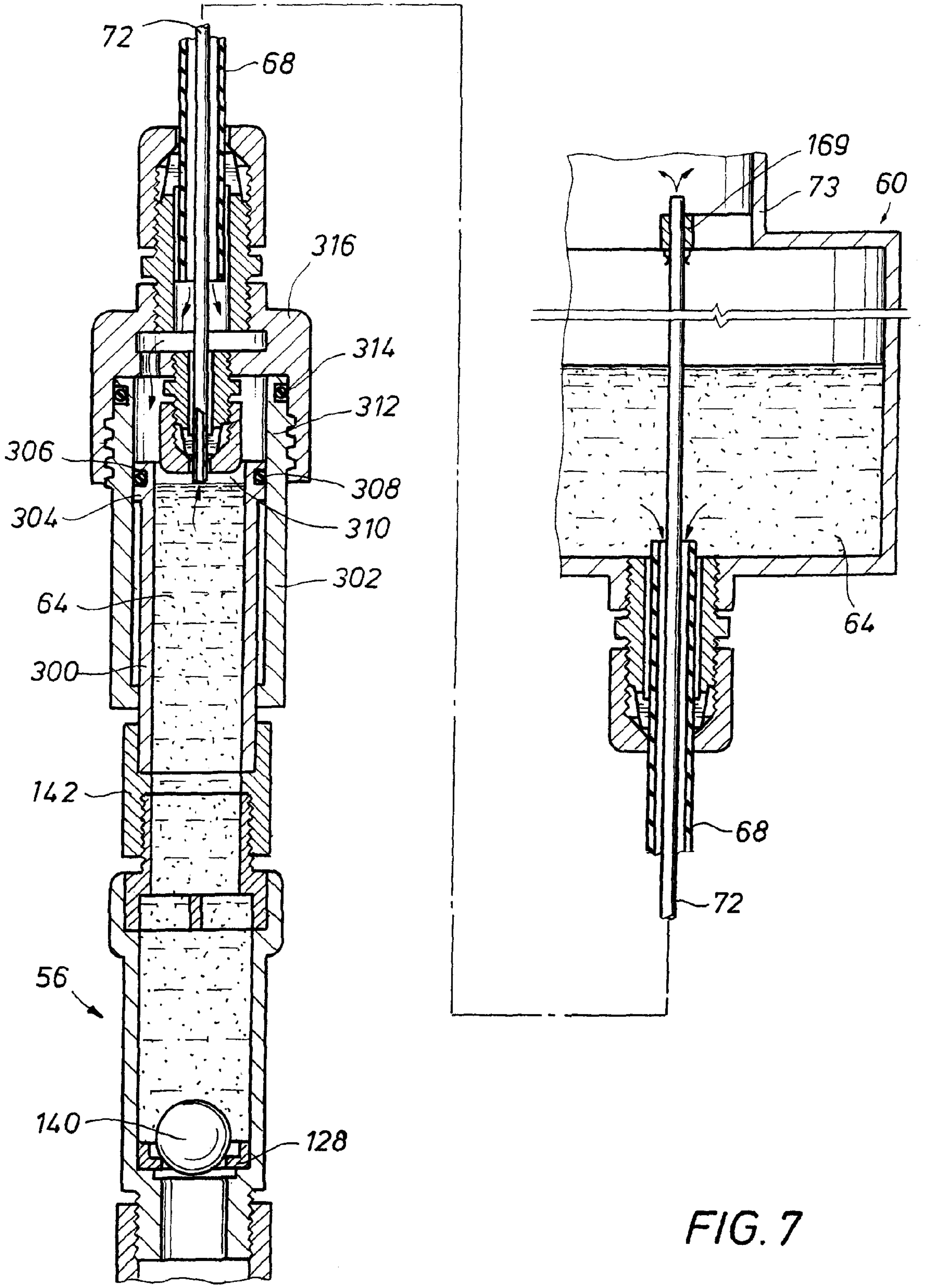
FIG. 7 is an elevational, cross-sectional view showing another embodiment of the dispenser used in the present invention.

Referring now to FIG. 7, there is shown another embodiment of the present invention having a structure for varying the volume of the dosing chamber. A tubular body 300 is threadedly or otherwise sealingly received in coupling 142 and is surrounded by a sleeve 302. Tubular housing 300 has an upset 304, O-ring or seal 308 being received in an annular internal groove in upset 304 forming a fluid tight seal between tubular member 300 and sleeve 302. Sleeve 302 can be moved axially relative to tubular member 300 to thereby vary the volume of the portion of the dosing chamber 310 formed by the combination of tubular member 300 and sleeve 302. Sleeve 302 has an externally threaded end 312 which carries an annular, external seal 314. Threaded end 312 is received in a threaded cap 316, seal ring 314 forming a fluid tight seal between cap 316 and sleeve 312. Thus, not only can the volume of dosing chamber 310 be varied by axial movement of sleeve 302 relative to tubular member 300, it can be further varied by movement of vent line 72 in dosing chamber 310. In this regard and as previously noted, vent line 72 is held at its upper end by an adjustable clamp such as a spring clip 169 which permits vent line 72 to move axially into and out of dosing chamber 310. It should be noted that while the upper open end of vent line 72 is shown as opening into container 60 and more specifically the neck portion 73 of container 60, it will be appreciated that vent line 72 could be vented to the interior of tank 10 or another atmosphere. For safety purposes, it is desirable that the open upper end of vent line 169 vent into container 60 to avoid the possibility of treating liquid being momentarily pressurized through vent line 72 and into the face of a worker should closure 64 of container 60 be removed.

Figure 8:
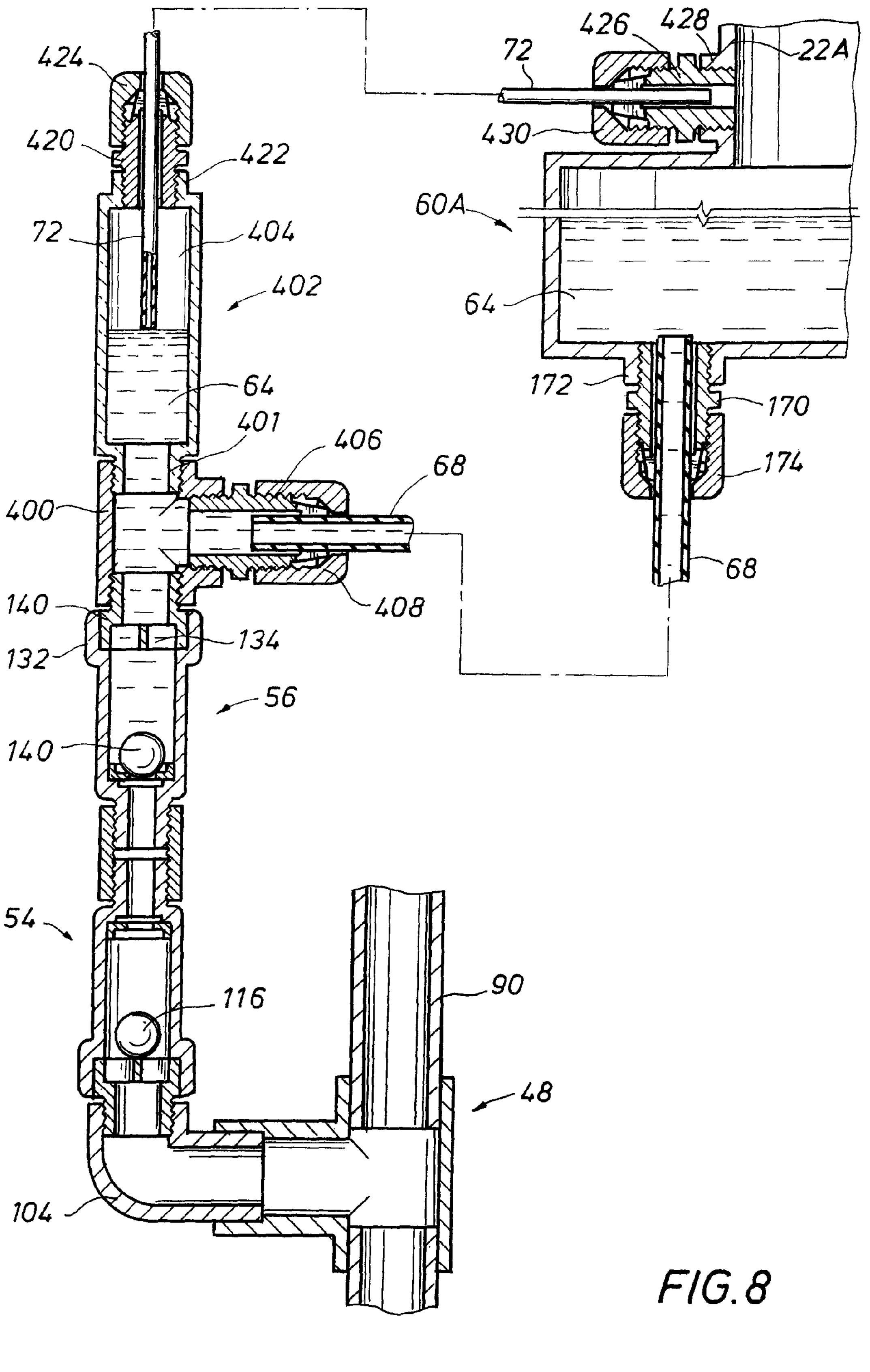
FIG. 8 is an elevational, cross-sectional view showing another embodiment of the dispenser used in the present invention.

Referring now to FIG. 8, there is shown yet another embodiment of the dispenser system of the present invention. While in the embodiments shown above, the vent line 73 passed through the feed conduit 68, as an alternative, a vent line and feed conduit can be separately connected to the dosing, i.e., without the vent line being received within the feed conduit. The threaded end of coupler 141 is received in a threaded end of a T 400. The opposite threaded end of T 400 receives the threaded neck portion 401 of a tubular housing 402 forming a portion 404 of a dosing chamber. Received in T 400, is a threaded coupling 406, feed conduit 68 being received and held in place in threaded coupling 406 by compression fitting 408. In a manner similar to that described above, feed conduit 68 is connected to treating liquid container 60A by compression fitting 174 threadedly received on a coupling 170 which in turn is threadedly received in a threaded boss 172 extending from the bottom wall of container 60A.

Vent line 72, as seen, extends into dosing chamber 404 passing through a coupling 420 which is received in a threaded boss 422 of housing 402, vent line 72 being held in place by a compression fitting 424 threadedly received on coupling 420. In a similar manner, the other end of vent line 72 extends into a threaded coupling 426 which is received in a threaded boss 428 protruding from the neck 22A of container 60A, vent line 72 being held in place by a compression fitting 430 threadedly received on coupling 426. As shown in FIG. 8, the lowest level of treating liquid 64 in container 60A is approximately at the level of treating liquid 64 in dosing chamber 404. In the embodiment shown in FIG. 8, container 60A is positioned such that the lowest liquid level of treating liquid in container 60A is substantially at or above the highest liquid level in the portion 404 of dosing chamber.

Figure 9:
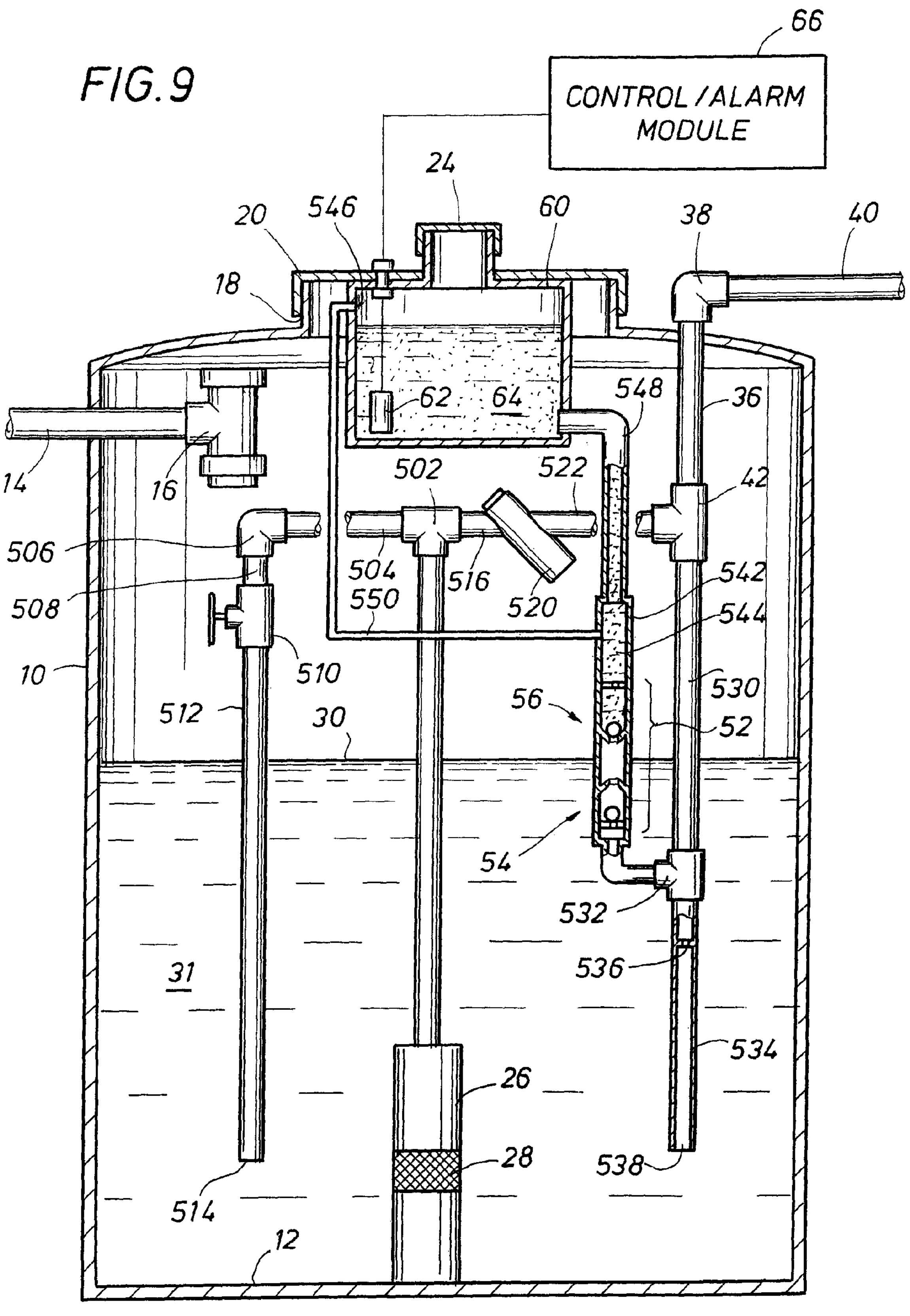
FIG. 9 is an elevational view, partly in section, showing another embodiment of the present invention.

Turning now to FIG. 9 there is shown another embodiment of the present invention. In the embodiment shown in FIG. 9, a discharge line 500 from pump 26 is connected to a T 502 which has one branch connected to a conduit 504 which in turn is connected by an elbow 506 and a conduit 508 to a valve 510 which can act as a flow restrictor, valve 510 being connected to recirculation conduit 512 having an open end 514 below the surface 30 of the source liquid 31. Another branch of T 502 is connected to a conduit 516 in which is positioned a filter 520, e.g., a spin filter well known to those skilled in the art, the output of spin filter 520 passing through a conduit 522 into T 42. The T 42 as in the case of the embodiments shown in FIGS. 1 and 2 is connected to a conduit 36 which ultimately connects to a discharge pipe 40. T 42 is also connected to a conduit 530 which in turn is connected to a T 532, a conduit 534 extending out of one branch of T 532 and having a flow restrictor 536 therein. The lower end 538 of conduit 534 is below the surface 30 of source liquid 31. T 532 is connected by an elbow 540 to a valving system substantially the same as valving system 52 comprising lower valve 54 and upper valve 56. A tubular housing 542 forms the upper portion 544 of a dosing chamber which is connected to container 60 via a feed conduit 548. A vent line 550 has an open end in chamber 544 and a second open end 546 into the vapor space in chamber 60 above treating liquid 64. If desired, vent line 550 could have its open end below the level of treating liquid 64. The operation of valves 54, 56 and the dispenser system is substantially that shown in FIG. 8 in the sense that feed conduit 548 is separate from vent line 550, i.e., vent line 550 does not pass through feed conduit 548. The principle of operation, however, is essentially the same as that shown in FIG. 8.

In effect the system shown in FIG. 9 provides two recirculation conduits although it will be appreciated that the recirculation conduit formed by conduit 534 could be a return line having its open end above the surface 30 of source liquid 31, the proviso being that the flow restrictor 536 if employed be below lower valve 54.

Filter 520, particularly a spin filter, as is well know to those skilled in the art, filters out small solid particles ensuring that the treated source water passing through conduit 532 is substantially solids free. Spin filters are well known to those skilled in the art and are widely used in wastewater treatment systems. The advantage of using spin filter 520, or other similar filters, in the embodiment shown in FIG. 9 is that since it removes solids down to a very small particle size, the chances of plugging flow restrictor 536 are virtually eliminated. In this regard, the intakes of some pumps, e.g., pump 26, may have a screen size which allows larger particles to enter pump 26 than if the intake of pump 26 filtered such larger particles out. By using spin filter 520, even if somewhat larger particles are taken in by pump 26, they will be filtered out by spin filter 520 before they can cause any plugging of flow restrictor 536.

Figure 10:
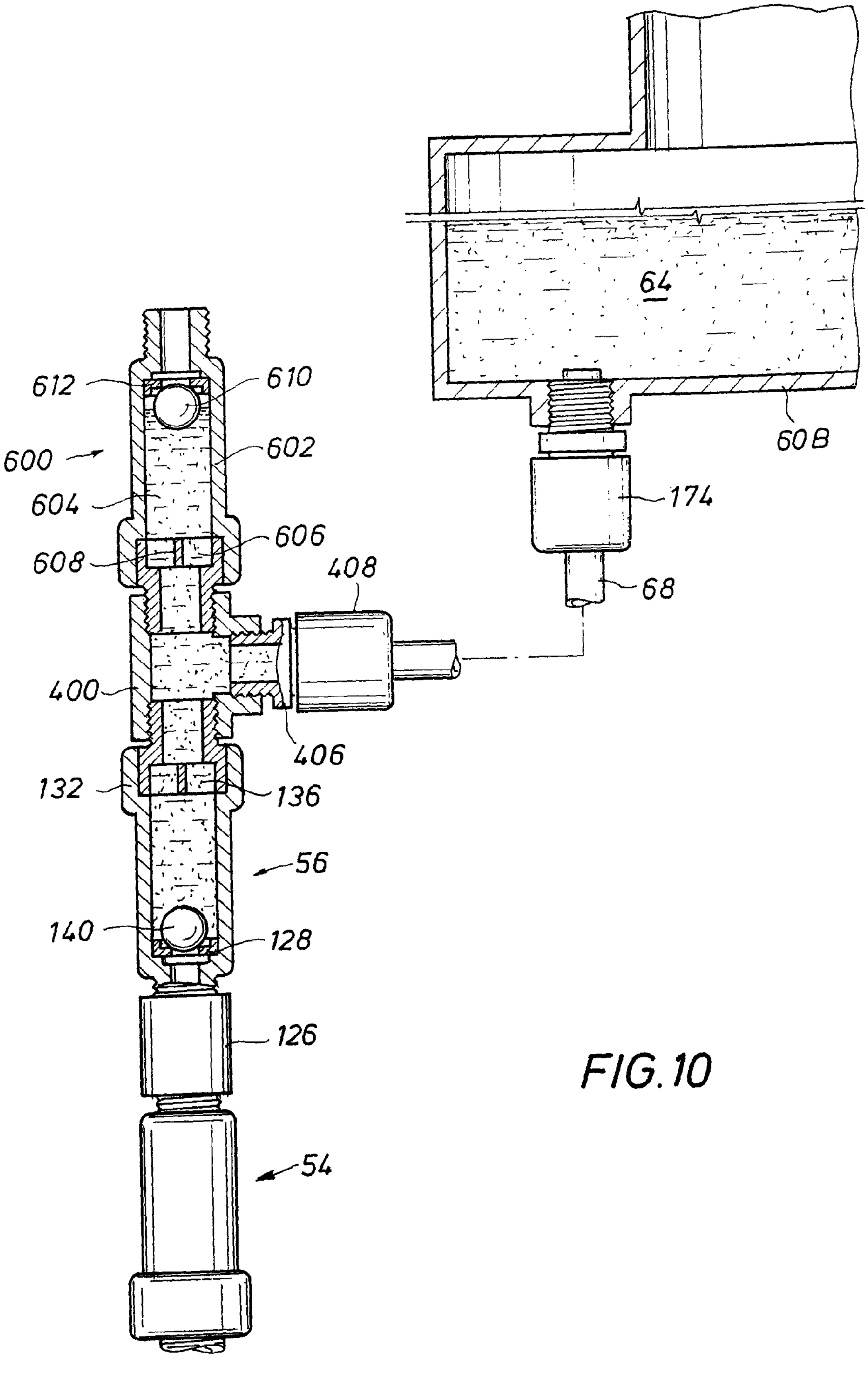
FIG. 10 is an elevational view, partly in section, showing another embodiment of the present invention.

Referring now to FIG. 10, there is shown yet another embodiment of the system used in the present invention. The system shown in FIG. 10 is essentially the same as that shown in FIG. 8, with the exception that instead of a vent line 72 being employed, a third valve 600 attached via coupling 400 to valve 56 is employed. Valve 600 has a tubular housing 602 forming an interior chamber 604 and, like valves 54 and 56, has ribs 606 and 608 which prevent ball 610 from falling out of valve 600 during assembly, storage, etc. Valve 600 also has a valve seat 612 which can be sealingly engaged by ball 610. As can be seen, ball 610 is floatable in treating liquid 64 shown in chamber 604 of valve 600. In the condition shown in FIG. 10, ball 140 is seated on seal 128, the space above ball 140 including the interior of valve 56, coupling 400 and chamber 604 being filled with treating liquid 64. In this condition, the pump is in the on position. When the pump is turned off, and as described above with respect to the other embodiments, ball 140 will be dislodged off of seat 128 and float upwardly against ribs 136 and 134. This will allow treating liquid 64 which has been trapped above ball 140 to flow into the source liquid 30 as described above with respect to the other embodiments. Concomitant with treating liquid 64 leaving chamber 604, ball 610 will no longer be seated against seat 612. In this regard, it will be appreciated that when the volume of liquid above ball 140 has drained out, ball 140 will again seat on seat 128 and treating liquid 64 will begin filling that volume through feed conduit 68. As filling continues, ball 610, being floatable in treating liquid 64 will rise upwardly until it engages seat 612. When this occurs, any further flow of treating liquid 64 from container 60B will be prevented. However, and as discussed above and seen in FIG. 10, the entire free volume of valves 54, 56, couplings 400 and valve 600 will have filled with treating liquid 64. During the filling cycle, the pump will be running. Once the pump is again turned off, as just explained, treating liquid 64 will now flow from that free volume, since the airlock in the chamber 604 will be broken because ball 610 will no longer sealingly engage seat 612 which will permit feeding liquid 64 to flow through feed conduit 68. While valve 600 can be of the same type as valves 54 and 56, an anti-siphon valve can be employed as well as valve 600. Further, valve 600 will be of a type which requires a relatively small pressure to effect sealing between the valve element and the valve seat. In this regard it should be noted, that generally speaking, treating liquid container 60B will be spaced only a short distance above valve 600. Accordingly, a relatively small head pressure is developed in interior chamber 604 acting against valve element 610. For valve 600 to act as a anti-siphon valve, valve element 610 and valve seat 612 must be in sealing engagement and the pressure required to achieve this has to be sufficient to force valve element 610 against valve seat 612. Thus, valve 600 will be any type of valve which will seal with a relatively small pressure forcing the ball against the seat. Preferably, the valve element and the valve seat can be brought into sealing engagement with a pressure of less than about 1 psi. This would accommodate most smaller wastewater treatment systems since in such systems the container for the treating liquid is generally not high enough above the valve to create any significant head pressure in the chamber formed by the valve.

Figure 11:
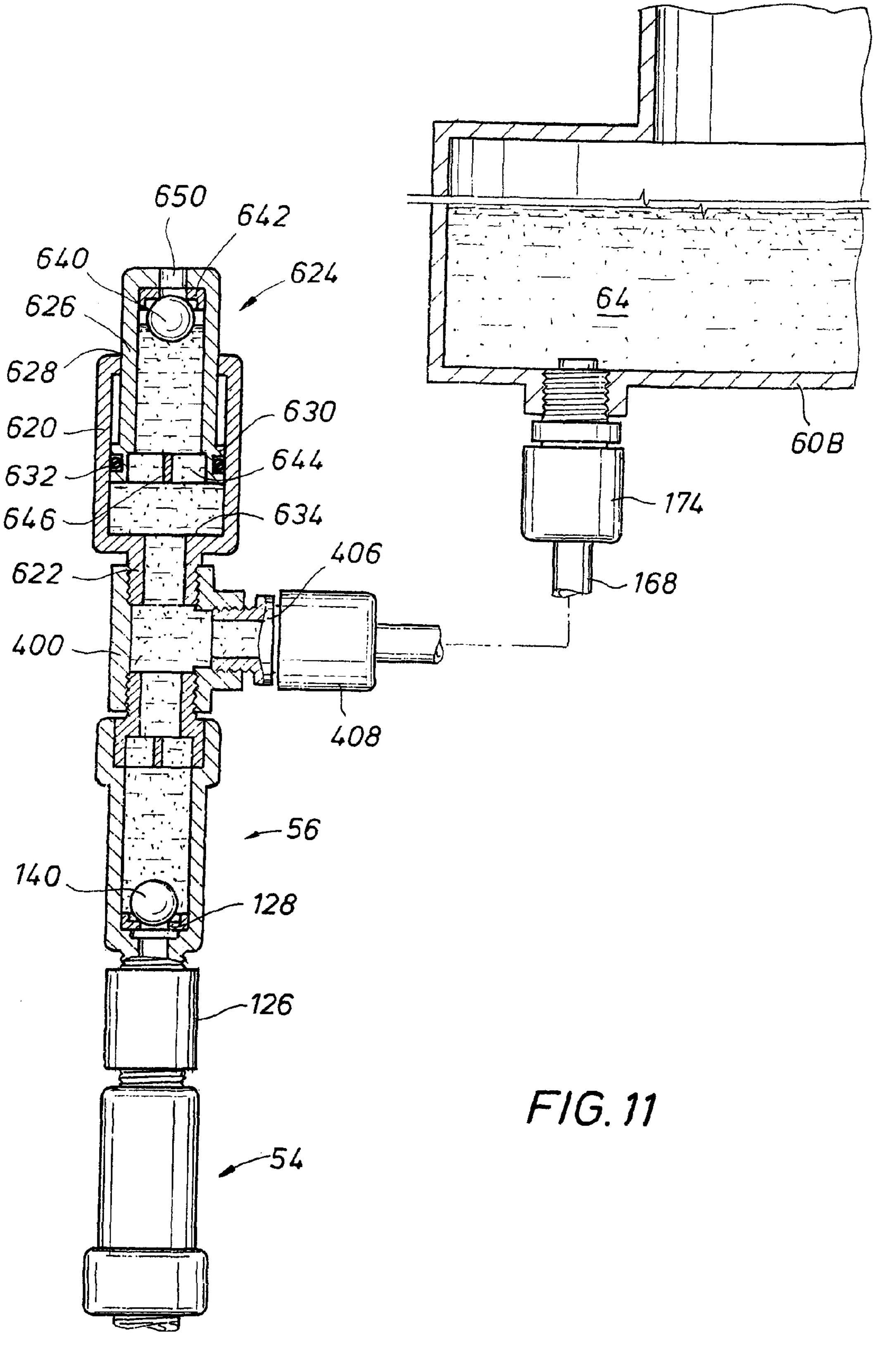
FIG. 11 is an elevational view, partly in section, showing another embodiment of the present invention.

Referring now to FIG. 11, there is shown a modification of the embodiment shown in FIG. 10 wherein the volume of the chamber above valve 56 can be varied. A tubular body 620 has an externally threaded neck 622 which is threadedly received in coupling 400. Received interiorly of tubular member 620 is a valve shown generally as 624 having a tubular housing 626 received through an upper opening 628 of tubular housing 620. The housing 626 has an upset portion 630 with an external, annularly extending groove in which is received a seal ring 632, as seen, seal ring 632 sealingly engaging the inner wall of tubular member 620. Essentially, valve 624 is slidably received in tubular member 620. Accordingly, depending upon where valve 624 is positioned in tubular housing 620, the amount of treating liquid 64 can be varied. For example, if valve 624 is moved downwardly relative to tubular housing 620 such that the upset portion 632 engages a bottom, annular wall 634 of tubular housing 620, the volume of the chamber formed by 620 will be reduced. Once again, FIG. 11 depicts the situation when the pump is running meaning that no flow out of the system is permitted. However, once the pump is activated, the sequence of events described above occurs, e.g., ball 140 is dislodged from seat 128 and the entire liquid volume thereabove flows downwardly and into the source liquid 31. Concomitant with this, ball 640, floatable in treating liquid 64, and which has been seated in sealing engagement with seat 642 now moves downwardly towards ribs 644 and 646. When this happens, air can escape through vent 650 meaning that treating liquid 64 can now commence flowing out of container 60B forcing ball 140 to seat against seat 128 and ball 640 to flow upwardly and seat against seat 142. Basically, the embodiments in FIGS. 10 and 11 shown a separate vent for breaking an airlock, the difference being that the embodiment of FIG. 11 allows the volume of treating liquid to be dosed by the system to be varied.

Figure 12:
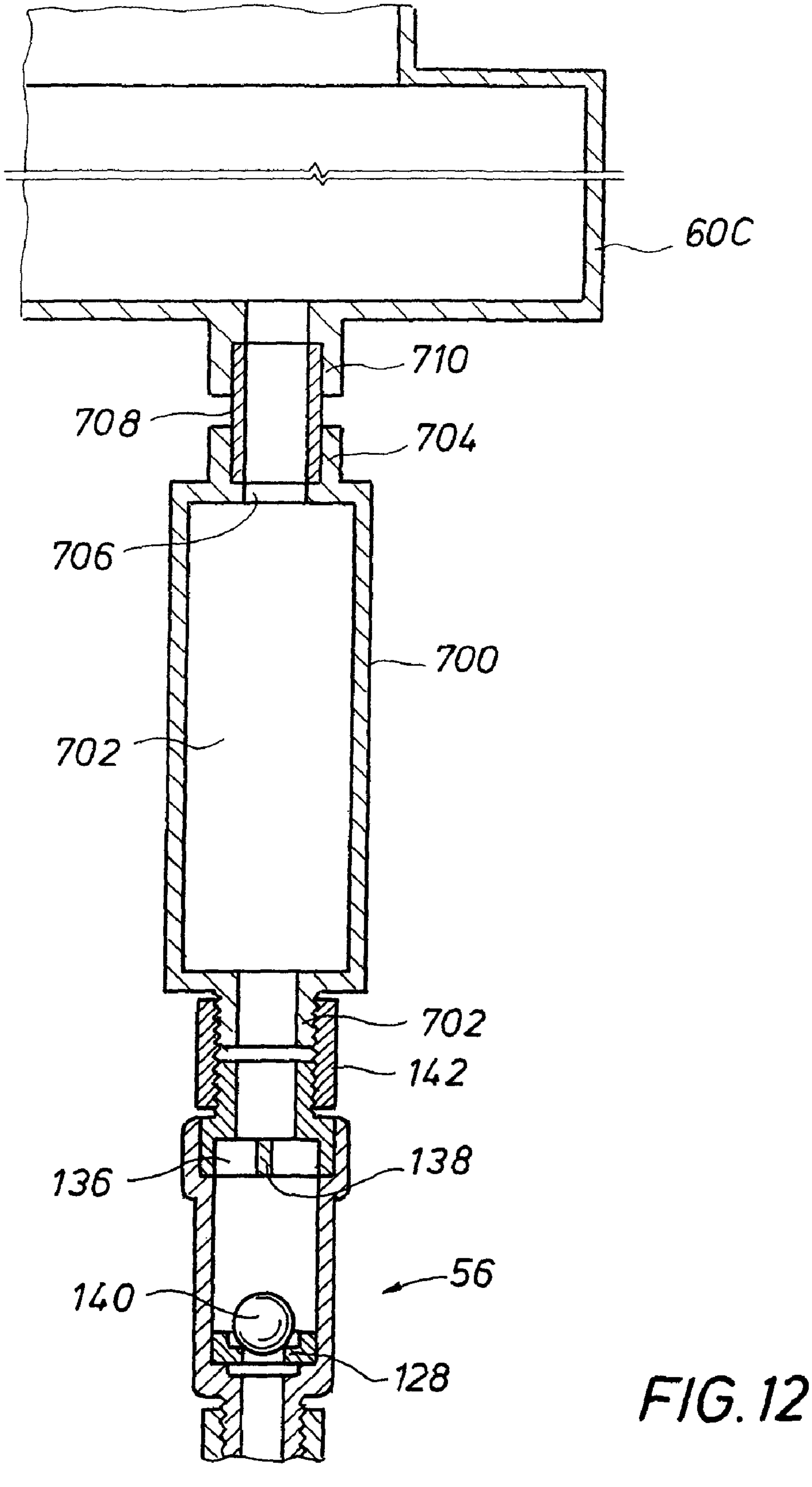
FIG. 12 is an elevational view, partly in section, showing another embodiment of the present invention.

Referring now to FIG. 12, there is are shown yet another embodiment of the present invention. Connected to valve 56 via coupling 142 is a tubular housing 700 having an externally threaded neck portion 702 threadedly received in coupling 142. Tubular housing 700 defines a chamber 702. At its upper end, tubular housing 700 is provided with another neck portion 704 having an opening 706, neck portion 704 receiving a pipe section 708, pipe section 708 being received in a boss 710 of a container 60C. As can be seen, chamber 702 is in open communication with the interior of container 60C. In the embodiment shown in FIG. 12, the pipe 608 serves the dual function of being a feed conduit and a vent to break any airlock above valve 140. In this regard, pipe 708 has an I.D. which is sufficient to permit treating liquid from container 60C to flow downwardly into chamber 702 while at the same time allowing air in chamber 702 to escape upwardly through pipe 708 into container 60C. It will be appreciated that when all the air in chamber 702 has passed upwardly through pipe 708 into container 60C, further downward flow of any treating liquid from container 60C will be prevented since there will once again be an airlock in chamber 702. The airlock will remain until the system is activated by deactivation of the pump as described above with the other embodiments. In that event, ball 140 will unseat from seat 128 and any liquid above ball 140 will commence flowing downwardly and ultimately into source liquid 31. Concomitantly, treating liquid in container 60C will flow downwardly through pipe 708 through opening 706 into chamber 702 until, as noted above, all air has been removed from chamber 702 creating an airlock and stopping the downward flow of any treating liquid out of container 60C.

While reference has been made to a “dosing chamber” and in the description of the various embodiments above, specific volumes inside of various housings, tubular members, etc., have been denoted as the dosing chamber or a dosing chamber and equivalent terms, it is to be understood as will be recognized from FIG. 4, that when the pump is running and ball 116 is sealingly engaging seat 120, the entire free volume above ball 116 can be considered a dosing chamber in the sense that once the pump is deactivated, the entire volume of liquid occupying the free space above ball 116 up to the point where the upper portion of the chamber is full, will be “dosed” into the source liquid 31. Thus, dosing chamber is intended to include not only any volume above valve 56 but rather any volume above valve 54 when ball 116 is seated against seat 120.

As will be understood from the above description, the vent used in the present invention can take on a variety of forms such as an airline or conduit, a valve such as shown in FIGS. 10 and 11 or other types of check valves, anti-siphon valves, or simply a large enough conduit connecting the main treating liquid container to the dosing chamber such that as air escapes from the dosing chamber, liquid is allowed to flow into the dosing chamber until all air has been pushed out of the dosing chamber once again stopping flow of treating liquid into the dosing chamber. Thus, as can be seen from the description of the various embodiments above, the vent, whether it be a vent line, a combined feed conduit and vent line, a valve, etc., is any configuration, assemblage or combination of parts, etc., which permits an airlock to be broken allowing flow of treating liquid into the dosing chamber while at the same time providing for the subsequent creation of an airlock to curtail flow of treating liquid into the dosing chamber. As further can be seen from the above description, the vent can be venting to any atmosphere which breaks an airlock, be it to a liquid-free space or under a liquid.

The term feed conduit or similar terms referring to the supply of disinfectant or other treating liquid from the container to the dosing chamber, is intended to mean any pipe, flow line or structure providing a flow path for the disinfectant or other treating liquid from the container to the dosing chamber.

While reference has been made to "first valve" and "second valve", it is to be understood that the valving system, e.g., valving system 52 could be a monolithic unit in the sense that both valve elements, e.g., balls, and valve seats, could be carried in the same housing. Commercially available valves that can be used in valves 54 and 56 are marketed by Jain Irrigation, Inc. as air/vacuum relief valves. In particular, it has been found that a Model VBK-1 air/vacuum relief valve sold by Jain Irrigation, Inc. is a relatively inexpensive valve which can serve as valves 54 and 56.

One of the advantages of the present invention is that since the disinfectant, e.g., chlorine, enters the pump tank after the pump goes off, the residual chlorine in the source liquid can be readily monitored. A problem with systems that introduce the disinfectant while the pump is running and therefore discharging liquid from the pump tank, is that it is difficult if not impossible to obtain an accurate reading of residual chlorine in the treated source liquid. Determination of the residual chlorine in the treating liquid is important for several reasons. For one, if too much residual chlorine is present in the treated source water, the treated source water which is discharged can damage vegetation, aquatic life, and even other wildlife. Moreover, it is a waste of disinfectant. On the other hand, if too little residual chlorine is present, it may be an indication that insufficient chlorine has been introduced into the system to achieve the desired degree of disinfecting. In this regard, it is important that the treated source water be free of bacteria to the extent possible.

Another advantage of the present invention is the fact that the dose of disinfectant introduced into the source water can be easily varied by a number of techniques as described above. Thus, over and above changing sizes of containers, tubular housings, etc., which make up the dosing chamber, those parameters can be varied and in conjunction with the vent vary the volume of liquid introduced into the source liquid.

For example when the vent comprises a vent line, the line could have a small diameter which would slow the rate of treating liquid from container 60 into the dosing chamber. Further, to prevent the treating liquid from emptying at an undesirably fast rate from the container 60, the feed conduit could also be sized with a smaller ID and/or have a restrictor to control flow of feed liquid through the conduit.

As seen from the above description, a recirculation pipe and/or a Venturi system is not required in the dispenser of the present invention. Thus, rather than the treating agent being introduced through a recirculation conduit, it can be simply introduced through a return line which has an open end above the level of source liquid in the tank 10. Additionally as noted above, although only a single pump 26 has been shown, it will be apparent to those skilled in the art that a separate, or auxiliary pump could be employed to control the operation of valving system 52 and the dispenser, this auxiliary pump serving no other purpose other than as a controller to operate valving system 52. In such a case a separate pump, e.g., pump 26, could be employed to discharge treated source liquid from tank 10 or a gravity flow system could be used.

A prime advantage of the present invention is that the treating liquid, e.g., disinfectant, is introduced into the untreated source liquid when the pump is not running ensuring a long residence time of the disinfectant in the source liquid. For example, the system could be easily set up such that a residence time of 24 hours or longer was achieved which would ensure thorough disinfecting of the source liquid without the need for extensive mixing. Since the system does not employ a Venturi, it eliminates a common problem which is the plugging of the Venturi by solids being circulated through the system. The elimination of the Venturi also provides a further additional advantage in that there is no loss of pump discharge volume since none of the discharge volume has to be dedicated to operation of the Venturi.

Another feature of the present invention is that wasteful use of disinfectant, e.g., chlorine, is eliminated. In this regard, since, as described above, the volume of disinfectant introduced into the liquid can be carefully controlled, an installer or serviceman can readily determine from the volume of source liquid being handled by the system what that volume of disinfectant should be and accordingly adjust the amount of disinfectant introduced into the dosing chamber.

The foregoing description and examples illustrate selected embodiments of the present invention. In light thereof, variations and modifications will be suggested to one skilled in the art, all of which are in the spirit and purview of this invention.

What is claimed is:

1. A dosing system comprising:

a container for a treating liquid;

a feed conduit having a first end in open communication with said container and a second end;

a dosing chamber having an upper portion operatively connected to said second end of said feed conduit, said upper portion of said dosing chamber having a vent for breaking any air lock in said upper portion of said dosing chamber;

a first valve operative to selectively control flow of treating liquid into said dosing chamber;

a second valve operative to selectively control flow of treating liquid out of said dosing chamber;

a selectively operable pressure source operatively connected to said first and second valves, said pressure source when actuated forcing said second valve to move toward a closed position and said first valve to open, continued application of pressure from said pressure source causing said second valve to close, while said first valve remains open and subsequent stoppage of pressure from said pressure source causing said second valve to open and said first valve to move toward a closed position.

* * * * *